(12) United States Patent
Liao

(10) Patent No.: US 10,742,107 B2
(45) Date of Patent: Aug. 11, 2020

(54) DUAL OUTPUT POWER SUPPLY

(71) Applicant: Wentai Technology Corporation, New Taipei (TW)

(72) Inventor: Yuan-Liang Liao, New Taipei (TW)

(73) Assignee: WENTAI TECHNOLOGY CORPORATION, New Taipei (TW)

( * ) Notice: Subject to any disclaimer, the term of this patent is extended or adjusted under 35 U.S.C. 154(b) by 29 days.

(21) Appl. No.: 16/359,890

(22) Filed: Mar. 20, 2019

(65) Prior Publication Data

US 2019/0326807 A1 Oct. 24, 2019

(30) Foreign Application Priority Data

Apr. 19, 2018 (TW) .............................. 107205117 U

(51) Int. Cl.
*H02M 1/08* (2006.01)
*H02M 3/155* (2006.01)
*H02M 1/00* (2006.01)

(52) U.S. Cl.
CPC ............. *H02M 1/08* (2013.01); *H02M 3/155* (2013.01); *H02M 2001/0048* (2013.01); *Y10T 307/305* (2015.04)

(58) Field of Classification Search
CPC ........... H02M 1/08; H02M 2001/0048; H02M 3/155; Y10T 307/305; Y10T 307/313; Y10T 307/32
USPC ................................................ 307/18, 19, 20
See application file for complete search history.

(56) References Cited

U.S. PATENT DOCUMENTS

| 2012/0025606 A1* | 2/2012 | Zheng | H02M 3/285 307/11 |
| 2016/0043625 A1* | 2/2016 | Han | H02M 7/08 363/65 |
| 2017/0331372 A1* | 11/2017 | Miki | H02J 9/066 |

* cited by examiner

*Primary Examiner* — William Hernandez
(74) *Attorney, Agent, or Firm* — Sinorica, LLC

(57) ABSTRACT

A dual output power supply including: a first power conversion unit for generating a first DC output voltage to drive a first load according to a DC input voltage; a second power conversion unit for generating a second DC output voltage to drive a second load according to the DC input voltage; a switching unit having two channel ends coupled to the first DC output voltage and the second DC output voltage respectively; a load power measurement unit for measuring a sum of power of the first load and the second load; and a digital microcontroller unit coupled to the switching unit and the load power measurement unit for determining a switching signal to drive a control terminal of the switching unit according to the sum of power.

7 Claims, 1 Drawing Sheet

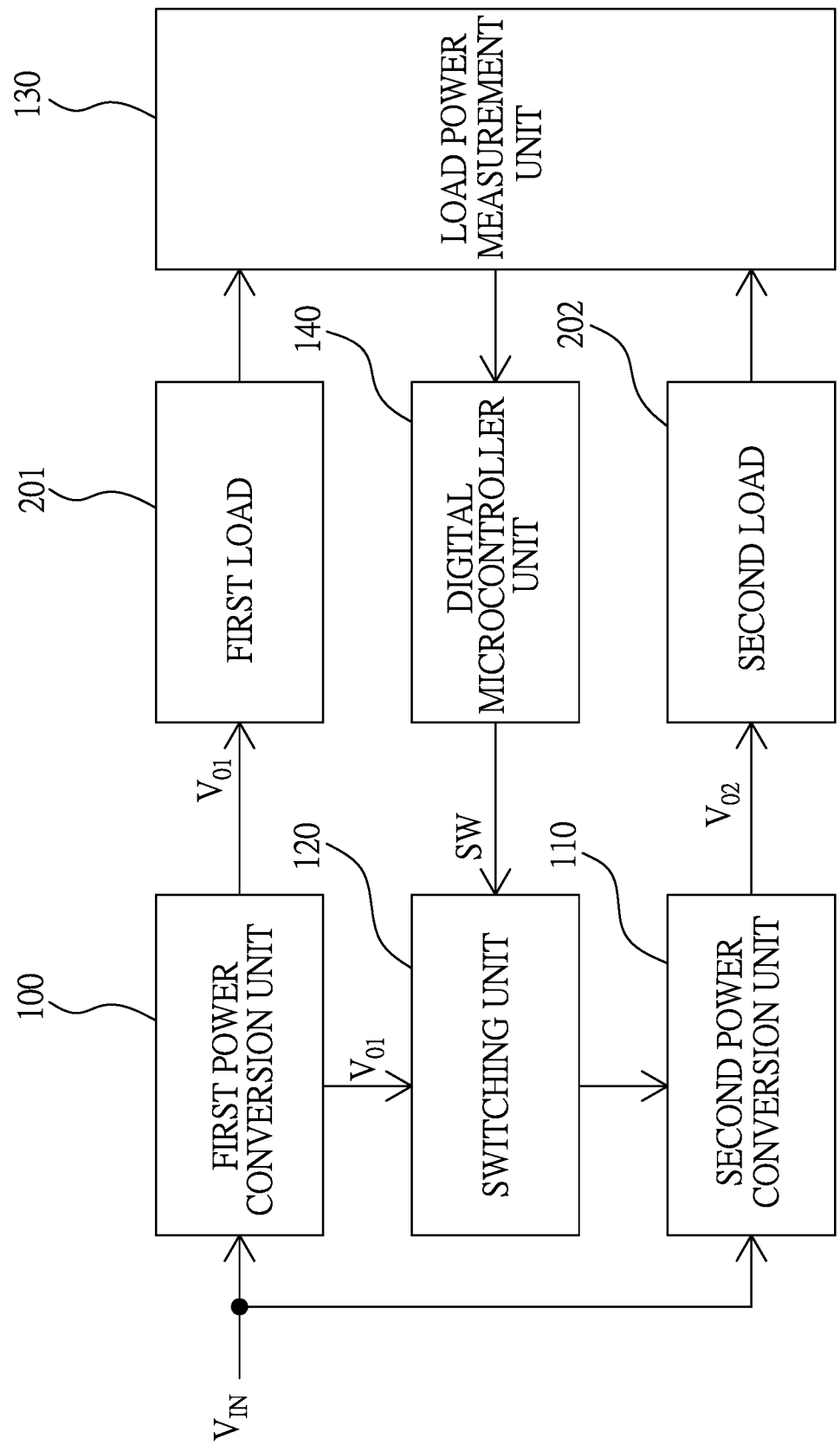

US 10,742,107 B2

DUAL OUTPUT POWER SUPPLY

BACKGROUND OF THE INVENTION

Field of the Invention

The present invention relates to a power supply, especially to a dual output power supply.

Description of the Related Art

In various power converter applications, there are different requirements for power conversion efficiency. Currently known energy efficiency grades can be divided into five different grades: white, bronze, silver, gold, platinum, and titanium. Among the five different grades, the titanium is the highest grade, which apart from requiring higher energy efficiency values at 20%, 50%, and 100% of a full load compared with the other four grades, further requires a strict energy efficiency value at 10% of the full load.

However, it is not easy to achieve the specified energy efficiency values from very light loads to heavy loads. Therefore, there is a need in the field for a novel power supply structure.

SUMMARY OF THE INVENTION

An objective of the present invention is to disclose a dual output power supply that can react to the sum of power of two loads by a digital microcontroller unit to generate two different power supply modes according to light load and heavy load conditions, thereby promoting power efficiency and saving energy.

To attain the foregoing objective, a dual output power supply is proposed including:
- a first power conversion unit for generating a first DC output voltage according to a DC input voltage, the first DC output voltage being used to drive a first load;
- a second power conversion unit for generating a second DC output voltage according to the DC input voltage, where a potential of the second DC output voltage is lower than a potential of the first DC output voltage, and the second DC output voltage is used to drive a second load;
- a switching unit having a channel and a control end, two ends of the channel being respectively coupled to the first DC output voltage and the second DC output voltage;
- a load power measurement unit for measuring a first power of the first load and a second power of the second load; and
- a digital controller unit coupled with the switching unit and the load power measurement unit to determine a switching signal to drive the control end of the switching unit according to a sum of the first power and the second power, wherein, when the sum is not higher than a threshold, the switching signal exhibits an inactive state to turn off the switching unit, and when the sum is higher than the threshold, the switching signal exhibits an active state to turn on the switching unit.

In one embodiment, the first power conversion unit is a switching power conversion unit.

In one embodiment, the second power conversion unit is a switching power conversion unit.

In one embodiment, the first power conversion unit has an output end to output the first DC output voltage.

In one embodiment, the first power conversion unit has a first output end and a second output end, the first output end and the second output end both output the first DC output voltage, the first output end is for coupling to the first load, and the second output end is for coupling to the channel of the switching unit.

In one embodiment, the switching unit includes a power transistor.

In one embodiment, the digital microcontroller unit has a memory unit to store a control program.

To make it easier for our examiner to understand the objective of the invention, its structure, innovative features, and performance, we use preferred embodiments together with the accompanying drawings for the detailed description of the invention.

BRIEF DESCRIPTION OF THE DRAWINGS

FIG. 1 is a block diagram of one embodiment of a dual output power supply of the present invention.

DETAILED DESCRIPTION OF THE PREFERRED EMBODIMENTS

Please refer to FIG. 1, which is a block diagram of an embodiment of the dual output power supply of the present invention. As shown in FIG. 1, the dual output power supply has a first power conversion unit 100, a second power conversion unit 110, a switching unit 120, a load power measurement unit 130, and a digital microcontroller unit 140.

The first power conversion unit 100 can be a switching power conversion unit for generating a first DC output voltage $V_{O1}$ according to a DC input voltage $V_{IN}$, and the first DC output voltage $V_{O1}$ is used to drive a first load 201.

The second power conversion unit 110 can be a switching power conversion unit for generating a second DC output voltage $V_{O2}$ according to the DC input voltage $V_{IN}$, and the potential of the second DC output voltage $V_{O2}$ is lower than the potential of the first DC output voltage $V_{O1}$, and the second DC output voltage $V_{O2}$ is used to drive a second load 202.

The switching unit 120 can include a power transistor having a channel and a control end, where two ends of the channel are coupled with the first DC output voltage $V_{O1}$ and the second DC output voltage $V_{O2}$ respectively.

The load power measurement unit 130 is configured to measure a first power of the first load 201 and a second power of the second load 202.

The digital microcontroller unit 140 has a memory unit for storing a control program, and is coupled to the switching unit 120 and the load power measurement unit 130 to determine a switching signal SW to drive the control terminal of the switching unit 120 according to a sum of the first power and the second power, where when the sum is not higher than a threshold, the switching signal SW exhibits an inactive state (for example, a low logic potential) to turn off the switching unit 120, and when the sum is higher than the threshold, the switching signal SW assumes an active state (for example, a high logic potential) to turn on the switching unit 120.

In addition, in an alternative embodiment, the first power conversion unit 100 may have an output end to output the first DC output voltage $V_{O1}$, or have a first output end and a second output end, where both the first output end and the second output end output the first DC output voltage $V_{O1}$, the first output end is coupled to the first load 201, and the second output end is coupled to the channel of the switching unit 120.

It can be seen from the above that, with the above disclosed design, which uses a digital microcontroller unit to monitor the sum of two loads, the dual output power supply of the present invention can provide two different power modes to increase power efficiency and save energy in response to different load conditions of light load and heavy load.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. A dual output power supply having:
    a first power conversion unit for generating a first DC output voltage according to a DC input voltage, the first DC output voltage being used to drive a first load;
    a second power conversion unit for generating a second DC output voltage according to the DC input voltage, wherein a potential of the second DC output voltage is lower than a potential of the first DC output voltage, and the second DC output voltage is used to drive a second load;
    a switching unit having a channel and a control end, wherein two ends of the channel being respectively coupled to the first DC output voltage and the second DC output voltage;
    a load power measurement unit configured to measure a first power of the first load and a second power of the second load;
    a digital microcontroller unit coupled to the switching unit and the load power measurement unit to determine a switching signal to drive the control end of the switching unit according to a sum of the first power and the second power, wherein, when the sum is not higher than a threshold, the switching signal exhibits an inactive state to turn off the switching unit, and when the sum is higher than the threshold, the switching signal exhibits an active state to turn on the switching unit.

2. The dual output power supply of claim 1, wherein the first power conversion unit is a switching power conversion unit.

3. The dual output power supply of claim 1, wherein the second power conversion unit is a switching power conversion unit.

4. The dual output power supply of claim 1, wherein the first power conversion unit has an output end to output the first DC output voltage.

5. The dual output power supply of claim 1, wherein the first power conversion unit has a first output end and a second output end, the first output end and the second output end both output the first DC output voltage, the first output end is for coupling to the first load, and the second output end is for coupling to the channel of the switching unit.

6. The dual output power supply of claim 1, wherein the switching unit comprises a power transistor.

7. The dual output power supply of claim 1, wherein the digital microcontroller unit has a memory unit to store a control program.

* * * * *